(12) United States Patent
Akanuma et al.

(10) Patent No.: US 9,312,744 B2
(45) Date of Patent: *Apr. 12, 2016

(54) VIBRATION GENERATOR

(71) Applicant: NIDEC SEIMITSU CORPORATION, Ueda-shi, Nagano-ken (JP)

(72) Inventors: Tomohiro Akanuma, Ueda (JP); Yuuki Yamada, Ueda (JP); Tetsuya Inoue, Ueda (JP)

(73) Assignee: NIDEC SEIMITSU CORPORATION, Ueda-shi (JP)

( * ) Notice: Subject to any disclaimer, the term of this patent is extended or adjusted under 35 U.S.C. 154(b) by 313 days.

This patent is subject to a terminal disclaimer.

(21) Appl. No.: 13/748,972

(22) Filed: Jan. 24, 2013

(65) Prior Publication Data

US 2013/0229070 A1 Sep. 5, 2013

(30) Foreign Application Priority Data

Mar. 2, 2012 (JP) ................................ 2012-047316

(51) Int. Cl.
| | |
|---|---|
| *H02K 33/00* | (2006.01) |
| *H02K 33/16* | (2006.01) |
| *B06B 1/04* | (2006.01) |
| *H02K 35/00* | (2006.01) |
| *H04M 19/04* | (2006.01) |

(52) U.S. Cl.
CPC ................ *H02K 33/00* (2013.01); *B06B 1/045* (2013.01); *H02K 33/16* (2013.01); *H02K 35/00* (2013.01); *H04M 19/047* (2013.01)

(58) Field of Classification Search
CPC ........ H02K 33/00; H02K 33/16; H02K 35/00

USPC ........ 310/12.16, 15, 16, 25; 335/185, 19, 193
See application file for complete search history.

(56) References Cited

U.S. PATENT DOCUMENTS

| | | | |
|---|---|---|---|
| 8,253,282 B2 * | 8/2012 | Park | 310/25 |
| 8,648,502 B2 * | 2/2014 | Park | 310/25 |
| 8,766,494 B2 * | 7/2014 | Park | 310/25 |

(Continued)

FOREIGN PATENT DOCUMENTS

| | | |
|---|---|---|
| CN | 201388144 Y | 1/2010 |
| CN | 201708677 U | 1/2011 |

(Continued)

*Primary Examiner* — Joshua Benitez-Rosario
*Assistant Examiner* — Rashad Johnson
(74) *Attorney, Agent, or Firm* — Westerman, Hattori, Daniels & Adrian, LLP

(57) ABSTRACT

A vibration generator includes a housing, a vibrating body arranged inside of a circumferential wall portion of the housing, and a band-like leaf spring arranged between the vibrating body and the circumferential wall portion. The leaf spring includes a connection portion connected to the vibrating body, an attachment portion attached to the circumferential wall portion of the leaf spring and an intermediate portion formed between the connection portion and the attachment portion to extend around the vibrating body. The connection portion and the attachment portion are arranged at one transverse side and the other transverse side of the vibrating body along a direction intersecting a vibration direction of the vibrating body. The intermediate portion is arranged in a vibration-direction outer region of the vibrating body and formed in a single layer to extend across the vibration direction of the vibrating body.

8 Claims, 8 Drawing Sheets

(56) References Cited

U.S. PATENT DOCUMENTS

| | | | |
|---|---|---|---|
| 2009/0096299 A1* | 4/2009 | Ota et al. | 310/25 |
| 2010/0213773 A1 | 8/2010 | Dong et al. | |
| 2011/0001365 A1* | 1/2011 | Park | H02K 33/16 310/17 |
| 2011/0006618 A1* | 1/2011 | Lee | B06B 1/045 310/25 |
| 2011/0018364 A1* | 1/2011 | Kim | H02K 33/18 310/17 |
| 2011/0018365 A1* | 1/2011 | Kim | B06B 1/045 310/17 |
| 2011/0018367 A1* | 1/2011 | Kim | B06B 1/045 310/25 |
| 2011/0062803 A1* | 3/2011 | Lee | H02K 33/18 310/29 |
| 2011/0089772 A1 | 4/2011 | Dong et al. | |
| 2011/0101796 A1* | 5/2011 | Odajima et al. | 310/25 |
| 2011/0133577 A1* | 6/2011 | Lee | 310/15 |
| 2011/0169347 A1 | 7/2011 | Miyamoto et al. | |
| 2011/0266915 A1* | 11/2011 | Matsubara et al. | 310/300 |
| 2011/0280433 A1* | 11/2011 | Park | 381/433 |
| 2011/0316361 A1* | 12/2011 | Park | H02K 33/16 310/25 |
| 2012/0169148 A1* | 7/2012 | Kim | H02K 33/18 310/25 |

FOREIGN PATENT DOCUMENTS

| | | |
|---|---|---|
| CN | 102143808 A | 8/2011 |
| JP | 2002-200460 A | 7/2002 |
| WO | 2010/026883 A1 | 3/2010 |

* cited by examiner

VIBRATION GENERATOR

BACKGROUND OF THE INVENTION

1. Field of the Invention

The present invention relates to a vibration generator for use in a portable terminal or the like. More specifically, the present invention pertains to a vibration generator in which a vibrating body reciprocatingly vibrated by magnetic fields is supported by a leaf spring.

2. Description of the Related Art

A portable terminal such as a cellular phone or the like includes a vibration generator capable of notifying a user of arrival of an incoming call. Different types of vibration generators have heretofore been developed. For example, there is known a vibration generator in which an eccentric weight is attached to a rotating shaft. The vibration generator of this type generates vibrations by rotating the eccentric weight with a motor. In the vibration generator of this type, it is however difficult to reduce the thickness thereof. Moreover, the vibration generator of this type suffers from problems in that the vibration generator is low in durability and tends to generate noises during a long-time use.

As a solution to these problems, there is available a vibration generator that reciprocatingly vibrates a vibrating body using the magnetic fields formed by a coil and a magnet.

Japanese Patent Application Publication No. 2002-200460 discloses a technology on a vibration actuator. The vibration actuator includes a fixing portion. The vibration actuator includes a plurality of magnets and a vibrating body having a yoke for closing the magnetic fluxes generated by the magnets. The vibration actuator further includes a plurality of elastic members for movably holding the vibrating body in the fixing portion. The vibration actuator further includes a coil interlinking with the magnetic fluxes generated by the magnets. If an electric current flows through the coil, the coil generates a thrust force between the fixing portion and the vibrating body so that the vibrating body can vibrate in a specified vibration direction.

In the technology disclosed in Japanese Patent Application Publication No. 2002-200460, the vibrating body is held by the elastic member arranged at the opposite sides of the vibrating body in the vibration direction of the vibrating body. The elastic member is formed by joining one longitudinal ends of two band-like leaf springs and bending the leaf springs from the joint portion at an acute angle. Alternatively, the elastic member may be formed by bending the longitudinal intermediate portion of a single band-like leaf spring at an acute angle. In other words, the elastic member includes two component parts formed into a plurality of layers in the vibration direction of a vibrating unit. The vibrating unit is held by the elastic member at the outer sides of the vibration direction.

PCT Patent Application Publication No. 2010/026883 discloses a technology on a linear motor and a cellular phone employing the linear motor. The linear motor includes a spiral coil and a vibrating body arranged in an opposing relationship with the spiral coil. The spiral coil includes a first portion extending in a direction orthogonal to the moving direction of the vibrating body and a second portion extending parallel to the moving direction of the vibrating body. The magnitude of the magnetic fluxes formed by the first portion is larger than the magnitude of the magnetic fluxes formed by the second portion.

In the technology disclosed in PCT Patent Application Publication No. 2010/026883, the vibrating body is held by leaf springs bent at an acute angle and arranged at the opposite sides of the vibrating body in the vibration direction of the vibrating body. In this technology, the elastic member includes two component parts formed into a plurality of layers in the vibration direction of a vibrating body. The vibrating body is held by the elastic member at the outer sides of the vibration direction.

U.S. Patent Application Publication Nos. 2010/0213773 and 2011/0089772 discloses a technology on a linear vibrator. The linear vibrator includes a housing, a vibrating body supported by an elastic member, and a coil arranged within the housing.

The elastic member disclosed in U.S. Patent Application Publication No. 2010/0213773 includes an attachment portion attached to a circumferential wall surface and an arm portion provided with a holding portion. The attachment portion and the arm portion are arranged parallel to each other and are connected to each other by a U-like connecting portion. In the elastic member disclosed in U.S. Patent Application Publication No. 2011/0089772, a holding portion is detachably attached to an arm portion. In the technology disclosed in U.S. Patent Application Publication Nos. 2010/0213773 and 2011/0089772, the vibrating body is supported by an elastic member having a complex shape at the outer sides of the vibration direction.

In the technologies disclosed in Japanese Patent Application Publication No. 2002-200460, PCT Patent Application Publication No. 2010/026883, U.S. Patent Application Publication No. 2010/0213773 and U.S. Patent Application Publication No. 2011/0089772, however, the ratio of the dimension of the elastic member of the leaf spring or the like to the gap between the circumferential wall surfaces supporting the elastic member in the vibration direction of the vibrating body becomes relatively large. For that reason, the dimension of the vibrating body in the vibration direction is limited by the dimension of the elastic member. This reduces the degree of freedom in designing the vibrating body. If the degree of freedom in designing the vibrating body is reduced, it becomes difficult to generate vibrations as desired, depending on the kinds of portable terminals employing the vibration generator.

SUMMARY OF THE INVENTION

In view of the problems noted above, the present invention to provides a vibration generator that makes it possible to design the vibration-direction dimension and structure of a vibrating body without being impeded by the vibration-direction dimension of an elastic member.

In accordance with an aspect of the present invention, there is provided a vibration generator, including: a housing including a circumferential wall portion extending along a peripheral edge of the housing; a vibrating body arranged inside of the circumferential wall portion of the housing in an opposing relationship with a coil and configured to reciprocatingly vibrate in one direction; a band-like leaf spring arranged between the vibrating body and the circumferential wall portion to support the vibrating body on the circumferential wall portion, wherein the leaf spring includes a connection portion connected to the vibrating body at one longitudinal end of the leaf spring, an attachment portion attached to the circumferential wall portion at the other longitudinal end of the leaf spring and an intermediate portion formed between the connection portion and the attachment portion to extend around the vibrating body, the connection portion and the attachment portion are arranged at one transverse side and the other transverse side of the vibrating body along a direction intersecting a vibration direction of the vibrating body, and the intermediate portion is arranged in a vibration-direction outer region of the vibrating body and formed in a single layer to extend across the vibration direction of the vibrating body.

In the vibration generator of the present invention, the intermediate portion of the leaf spring formed in a single layer in the vibration direction exists in the region outside the vibrating body along the vibration direction of the vibrating body. It is therefore possible to significantly reduce the occupying percentage of the leaf spring in the gap between the circumferential wall portions opposed to each other in the vibration direction. This makes it possible to increase the vibration-direction dimension of the vibrating body. By increasing the vibration-direction dimension of the vibrating body, it becomes easy to design the vibrating body as desired, e.g., to more outwardly arrange the weights than when the vibrating body is supported by a leaf spring having a conventional structure. By increasing the vibration-direction dimension of the vibrating body, it is possible to increase the amplitude of the vibrating body. Since the degree of freedom in designing the vibration generator is enhanced in this way, it becomes possible to generate vibrations as desired, depending on the kinds of portable terminals employing the vibration generator.

The vibrating body may include a pair of weights arranged in vibration-direction outer regions of the vibrating body and a magnet arranged between the weights.

In the vibration generator of the present invention, the weights are arranged in the vibration-direction outer regions. It is therefore possible for the vibration generator to generate a suitable inertial force with light weights. This makes it possible to reduce the weight of a portable terminal. Since the weights are arranged in the vibration-direction outer regions in the vibration generator of the present invention, it is possible to effectively use the space existing between the weights. This makes it possible to select a magnet having a suitable size and a suitable magnetic force. Accordingly, it becomes possible to generate vibrations as desired, depending on the kinds of portable terminals.

Each of the weights may include a lateral weight portion arranged in each of the vibration-direction outer regions of the vibrating body and a central weight portion arranged at the other transverse side of the vibrating body along the direction intersecting the vibration direction of the vibrating body to extend from the lateral weight portion toward the vibration-direction center of the vibrating body.

In the vibration generator of the present invention, the magnets arranged between the weights can be supported by the inner surfaces of the weights. This makes it possible to arrange the magnets in appropriate positions in alignment with the coil.

The lateral weight portion may be arranged outward of an outer peripheral portion of the coil in the vibration direction of the vibrating body.

In the vibration generator of the present invention, it is possible to form a vibrating body having a large inertial force. This makes it possible to reduce the weight of the vibrating body.

The lateral weight portion may include a surface lying at the side of the coil and protruding toward a rear surface of the coil beyond a front surface of the coil opposed to the vibrating body.

In the vibration generator of the present invention, even if the thickness of the lateral weight portion arranged more outwardly than the outer peripheral portion of the coil is increased, it is possible to vibrate the vibrating body with no likelihood of interference between the weights and the coil. In the vibration generator of the present invention, the increase in the thickness of the lateral weight portion makes it possible to reduce the vibration-direction dimension of the lateral weight portion and to widen the region in which the magnets are arranged.

The leaf springs may include a first and a second leaf spring respectively arranged at the opposite sides of the vibrating body in the vibration direction of the vibrating body.

In the present invention, the vibrating body is supported by the first and second leaf springs. It is therefore possible to reduce the load applied to the first and second leaf springs. In the present invention, it is also possible to vibrate the vibrating body in a well-balanced manner at the opposite sides in the vibration direction of the vibrating body.

The first and second leaf springs may be formed into an one-piece member.

In the present invention, the first and second leaf springs are formed into an one-piece member. It is therefore possible to reduce the number of components. This makes it possible to reduce the number of assembling steps and to facilitate an assembling process. In the present invention, the fixing strength and the accuracy of the leaf springs can be increased by forming the leaf springs into an one-piece member.

The housing may further include a bottom member to which the coil is attached and a case having the circumferential wall portion and a top portion closing a top end thereof, the vibrating body including an upper surface making contact with an inner surface of the top portion, and the vibration generator further includes: a sliding member arranged on at least one of an upper surface of the vibrating body and an inner surface of the top portion to smoothly slide the vibrating body with respect to the inner surface of the top portion.

In the present invention, the vibrating body is caused to vibrate along the top portion of the housing. It is therefore possible to prevent the vibrating body from being tilted and to effectively prevent the vibrating body from colliding with the housing and generating noises. Since the sliding member generating low friction between the vibrating body and the top portion is arranged on the upper surface of the vibrating body, there is no possibility that the smooth vibration of the vibrating body in hindered.

The coil may be a hollow-core spiral coil formed by spirally winding a wire. The bottom member of the housing may have a communication groove interconnecting the inside and the outside of the coil, the coil including a lead wire extending from an inner edge of the coil and passing through the communication groove.

In the present invention, the lead wire extending from the inner edge of the coil is not gripped between the coil and the bottom member. Accordingly, it is possible to prevent the coil from being tilted by inserting the lead wire. As a consequence, the coil can generate magnetic fields in a proper direction, which makes it possible to smoothly vibrate the vibrating body. Since the coil is not tilted, it is possible to prevent the coil from making contact with the vibrating body and generating noises.

The vibration generator according to the present invention makes it possible to design the vibration-direction dimension and structure of the vibrating body without being limited by the vibration-direction dimension of the leaf spring. This makes it possible to increase the vibration-direction dimension of the vibrating body. Since the dimension of the vibrating body can be increased, it is possible to design a vibrating body in which the weights are arranged in the positions relatively distant from the vibration-direction center of the vibrating body. It is also possible to design a vibration generator in which the vibrating body can vibrate over an increased extent. As a consequence, the vibration generator of the present invention can generate vibrations as desired, depending on the kinds of portable terminals.

Other features, elements, steps, characteristics and advantages of the present invention will become more apparent from the following detailed description of preferred embodiments of the present invention with reference to the attached drawings.

DETAILED DESCRIPTION OF THE INVENTION

Preferred embodiments of the present invention will now be described with reference to the accompanying drawings which form a part hereof. The technical scope of the present invention is not limited to the following description and the accompanying drawings.

A vibration generator 1A or 1B according to the present embodiment is arranged within a portable terminal such as a cellular phone or the like. The vibration generator 1A is a basic-type vibration generator according to a first preferred embodiment shown in FIGS. 1 through 5. The vibration generator 1B is a vibration generator according to a second preferred embodiment shown in FIG. 8, in which a vibrating body is brought into contact with a case without providing a space between the upper surface of the vibrating body and the top portion of the case. The present invention will now be described on an embodiment-by-embodiment basis.

First Preferred Embodiment

The basic structure of the vibration generator 1A according to the first preferred embodiment of the present invention is as follows.

Figure 1:
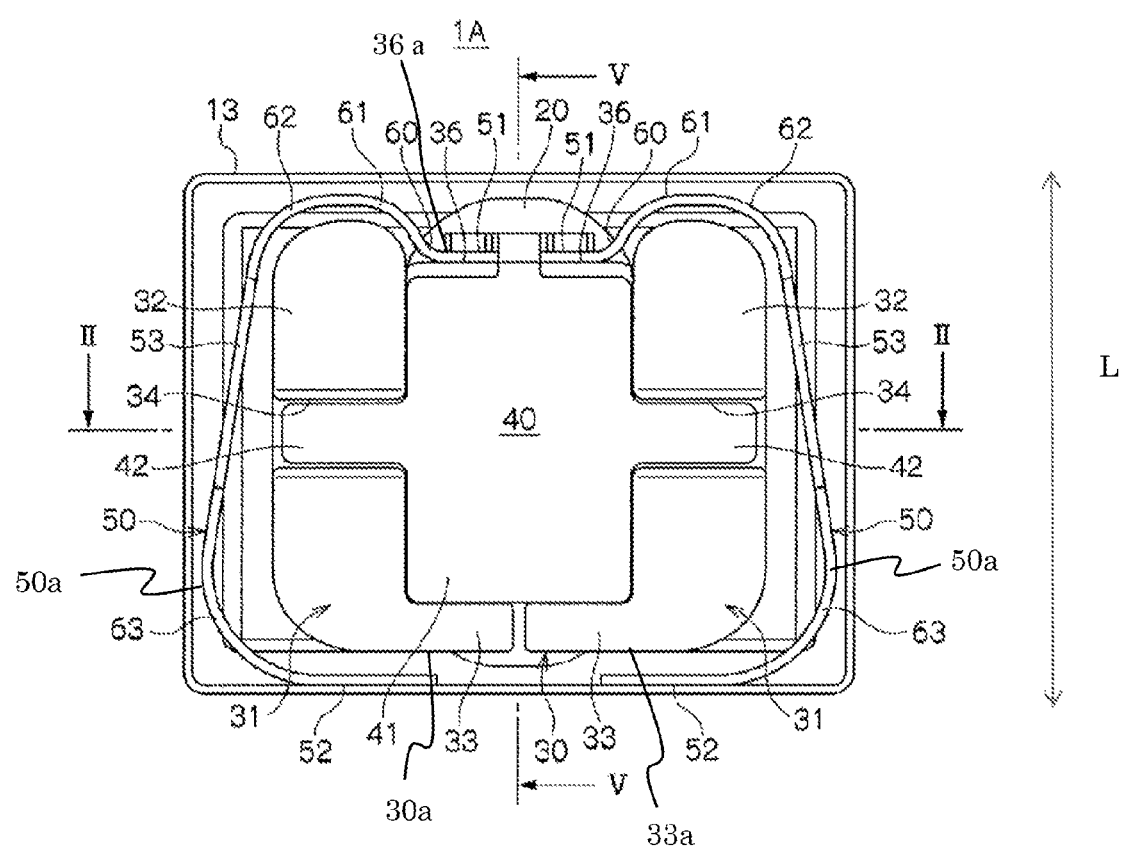
FIG. 1 is a plan view showing the internal structure of a vibration generator according to a first preferred embodiment of the present invention.
Figure 2:
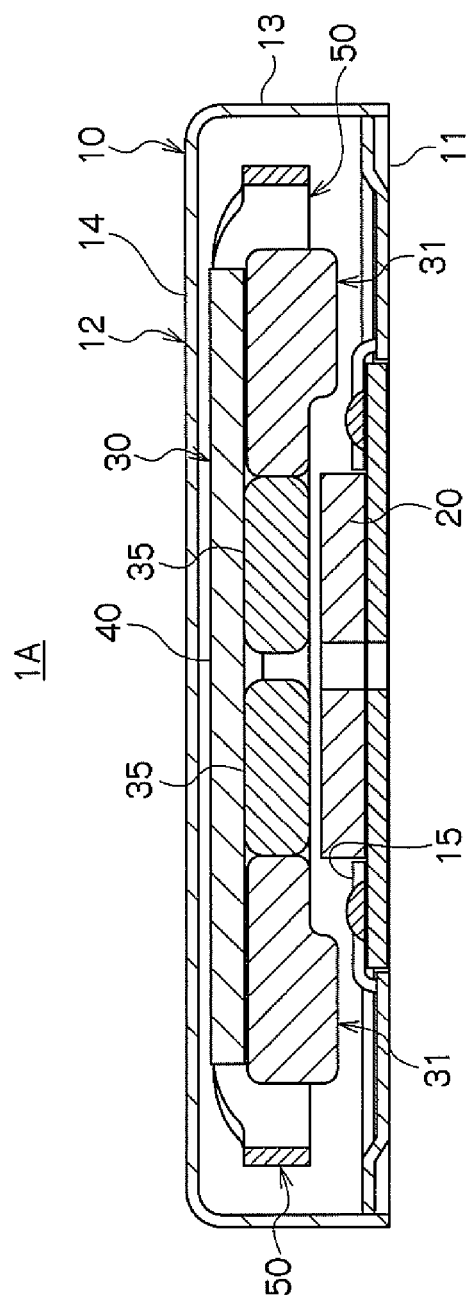
FIG. 2 is a vertical section view taken along line II-II in FIG. 1.
Figure 3:
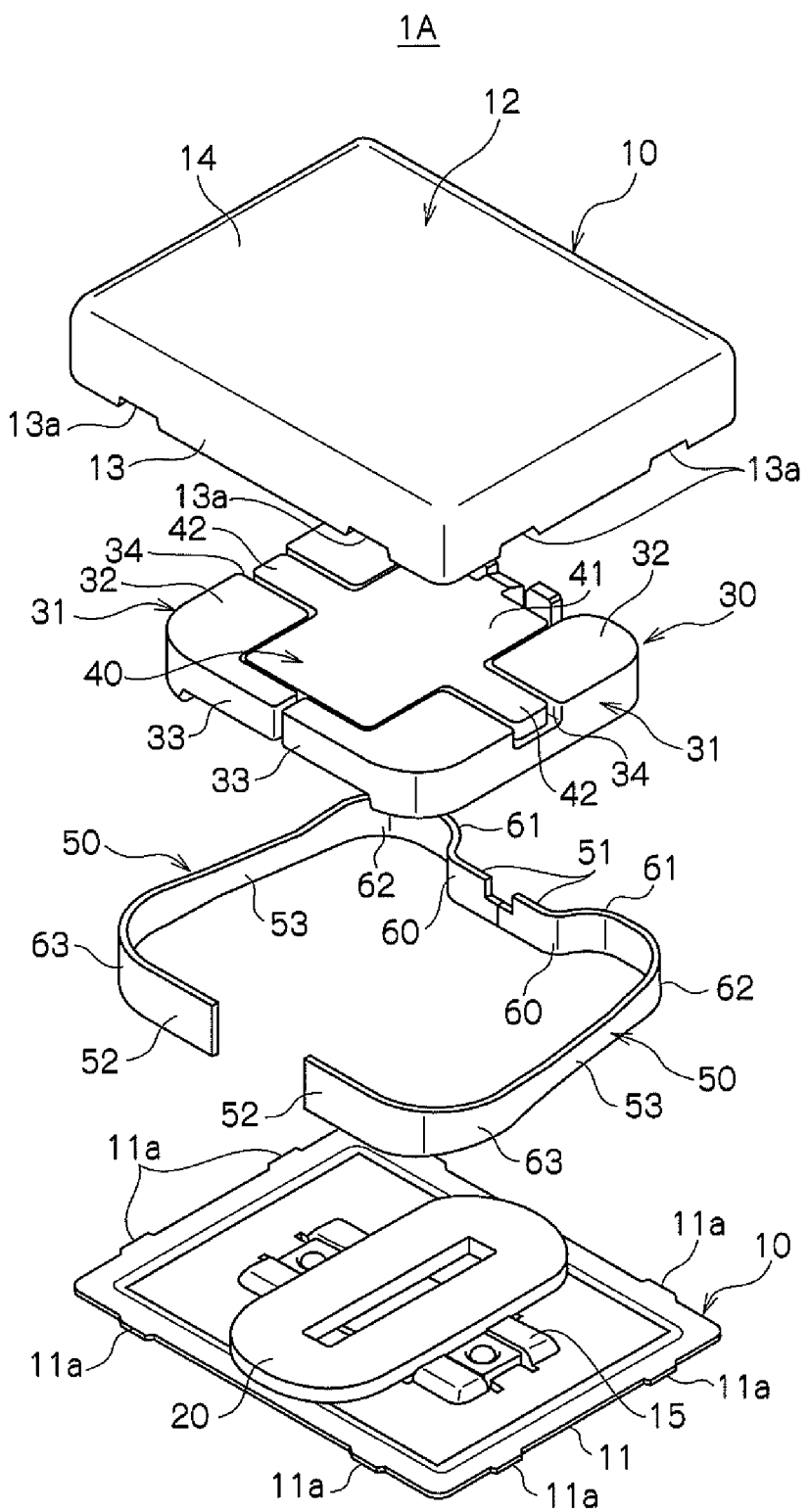
FIG. 3 is an exploded perspective view of the vibration generator shown in FIG. 1.

Referring to FIGS. 1 through 3, the vibration generator 1A preferably includes a housing 10 making up an outer shell. The housing 10 preferably includes a bottom member 11 and a case 12 capped on the bottom member 11. The case 12 preferably includes a circumferential wall portion 13 extending along the peripheral edge of the case 12 and a top portion 14 closing the top end of the case 12.

A coil 20 is arranged within the housing 10 and is positioned on the bottom member 11. A vibrating body 30 is arranged within the housing 10 in an opposing relationship with the coil 20. Band-like leaf springs 50 for supporting the vibrating body 30 with respect to the circumferential wall portion 13 are arranged within the housing 10.

The coil 20 is a hollow-core spiral coil formed by spirally winding a wire so that a space can be defined in the central region thereof. The vibrating body 30 is formed to have, e.g., a rectangular contour or a substantially rectangular contour. The vibrating body 30 is reciprocatingly vibrated in one direction between the coil 20 and the top portion 14 of the case 12 by virtue of the interaction of the magnetic fields generated by itself and the magnetic fields generated by the coil 20 arranged on the bottom member 11.

The leaf springs 50 are arranged in pair. The leaf springs 50 are arranged at the vibration-direction opposite sides of the vibrating body 30 and are positioned between the vibrating body 30 and the circumferential wall portion 13 of the case 12, thereby supporting the vibrating body 30 on the circumferential wall portion 13. Each of the leaf springs 50 preferably includes a connection portion 51 connected to the vibrating body 30 at one longitudinal end thereof, an attachment portion 52 attached to the circumferential wall portion 13 at the other longitudinal end thereof and an intermediate portion 53 formed between the connection portion 51 and the attachment portion 52 to extend around the vibrating body 30. The connection portion 51 and the attachment portion 52 of each of the leaf springs 50 are arranged at one transverse side and the other transverse side of the vibrating body 30 along a direction intersecting the vibration direction of the vibrating body 30, with the vibrating body 30 interposed between the connection portion 51 and the attachment portion 52. The intermediate portion 53 of each of the leaf springs 50 is formed in a single layer in a vibration-direction outside region of the vibrating body 30. The intermediate portion 53 of each of the leaf springs 50 extends across the vibration direction of the vibrating body 30. As one embodiment, the vibrating body 30 has a first profile 30a extending in a longitudinal direction L having a first end 36a and a second end 33a. The first end 36a is opposite to the second end 33a in the longitudinal direction L of the vibrating body 30. The leaf spring 50 has a second profile 50a entirely located outside the first profile 30a of the vibrating body in a plan view (FIG. 1). The leaf spring 50 includes a first attachment portion 52, a first intermediate portion 53, a connection portion 51, a second intermediate portion 53 and a second attachment portion 52. The connection portion 51 is connected to the first end 36a of the vibrating body. The first attachment portion 52 and the second attachment portion 52 are attached to the circumferential wall portion such that the first attachment portion and the second attachment portion are separated from and opposed to the second end 33a of the vibrating body. The first intermediate portion 53 extends between the connection portion 51 and the first attachment portion 52, and the second intermediate portion 53 extends between the connection portion 51 and the second attachment portion 52.

In the vibration generator 1A of the present invention, only the intermediate portion 53 formed in a single layer exists between the vibrating body 30 and the circumferential wall portion 13 in the vibration direction of the vibrating body 30. This makes it possible to effectively use the space defined between the vibrating body 30 and the circumferential wall portion 13. For that reason, the vibration-direction dimension of the vibrating body 30 can be increased without being limited by the dimension of each of the leaf springs 50 in the vibration direction of the vibrating body 30. The increase in the vibration-direction dimension of the vibrating body 30 makes it possible to obtain an effect specific to the present invention in that the degree of freedom in designing the vibrating body 30 becomes higher. It is also possible to obtain an effect specific to the present invention in that the amplitude of the vibrating body 30 can be made larger.

The respective components of the present vibration generator will be described in more detail with reference to FIGS. 1 through 5.

Figure 5:
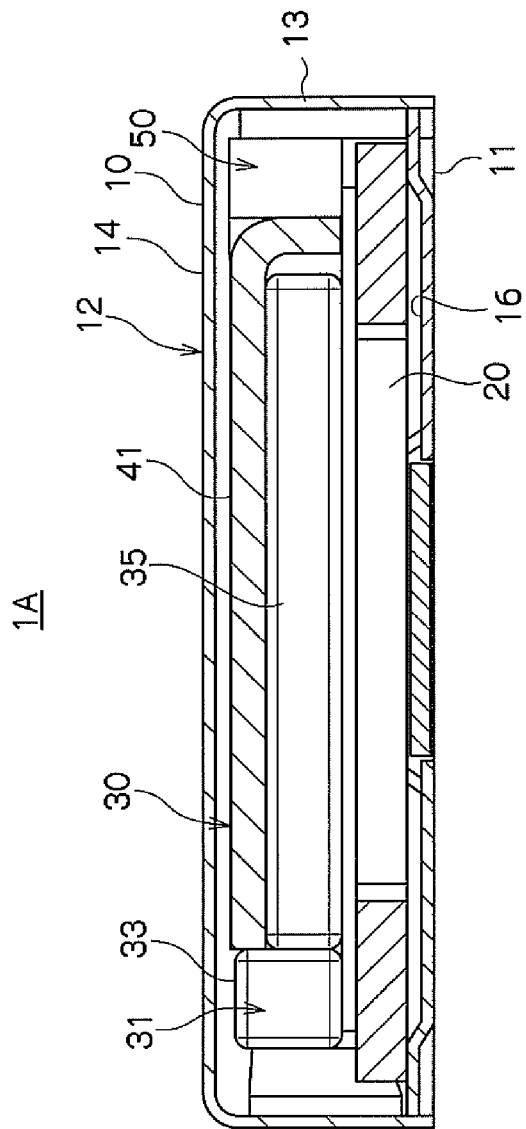
FIG. 5 is a vertical section view taken along line V-V in FIG. 1.

As shown in FIGS. 2, 3 and 5, the housing 10 makes up an outer shell of the vibration generator 1A. The housing 10 is formed into, e.g., a flat rectangular parallelepiped shape with a reduced height.

The housing 10 is made of a non-magnetic material. The housing 10 preferably includes a flat bottom member 11 formed into, e.g., a rectangular shape or a substantially rectangular shape and a case 12 capped on the bottom member 11. The case 12 preferably includes a circumferential wall portion 13 extending along the peripheral edge of the case 12 and a top portion 14 closing the top end of the case 12.

As shown in FIG. 3, the bottom member 11 has positioning protrusions 11a protruding outward from two points of each of four sides of the bottom member 11 defining the peripheral edge of the bottom member 11. The case 12 has recesses 13a formed on a lower surface of the circumferential wall portion 13 in a corresponding relationship with the positioning protrusions 11a. The positioning protrusions 11a are inserted into the recesses 13a. The bottom member 11 and the case 12 can be assembled together by inserting the positioning protrusions 11a of the bottom member 11 into the recesses 13a of the circumferential wall portion 13. The bottom member 11 has a coil holder 15 formed in the central region thereof. The coil 20 is held by the coil holder 15.

The coil 20 is a hollow-core spiral coil formed by spirally winding a wire through which an electric current flows such that a space is defined in the central region thereof. The coil 20 is formed into, e.g., an elliptical shape or a substantially elliptical shape such that the longitudinal dimension thereof becomes longer than the transverse dimension thereof. The coil 20 is held by the coil holder 15 with the longitudinal direction thereof running orthogonal to the vibration direction of the vibrating body 30.

Figure 4:
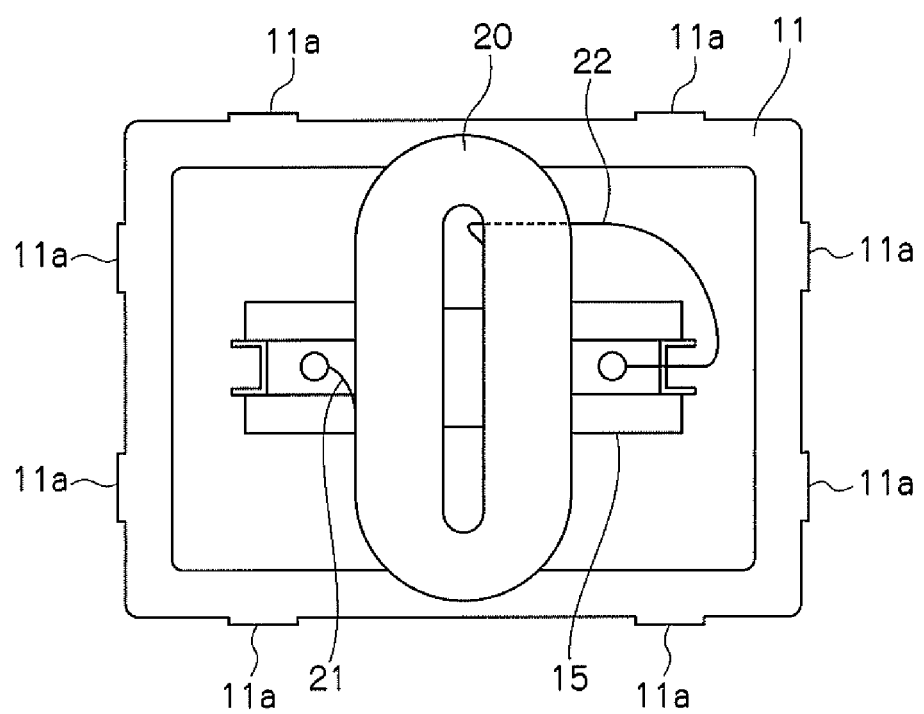
FIG. 4 is an explanatory view schematically illustrating the installation state of a coil in the vibration generator shown in FIG. 1.

As shown in FIG. 4, the coil 20 preferably includes lead wires 21 and 22 extending from the inner and outer edges of the coil 20 toward the outside of the coil 20. If the lead wire 22 extending from the inner edge of the coil 20 is led out toward the outside of the coil 20 through between the bottom member 11 and the coil 20, the coil 20 is tilted because the lead wire 22 is gripped between the bottom member 11 and the coil 20. In the vibration generator 1A, as shown in FIG. 5, the bottom member 11 of the housing 10 has a communication groove 16 interconnecting the inside and the outside of the coil 20. The lead wire 22 extending from the inner edge of the coil 20 passes through the communication groove 16. As a consequence, the lead wire 22 is not gripped between the coil 20 and the bottom member 11. Accordingly, the coil 20 is held by the coil holder 15 without being tilted.

As shown in FIGS. 2 and 5, the vibrating body is arranged parallel to the coil 20 with a gap left between the vibrating body 30 and the upper surface of the coil 20, and is supported by the leaf springs 50. The vibrating body 30 is formed to have, e.g., a rectangular shape or a substantially rectangular overall shape. The vibrating body 30 preferably includes a pair of weights 31 arranged at the longitudinal opposite sides of the vibrating body 30, a pair of magnets 35 arranged inside the weights 31 and a cover 40 covering the magnets 35 from above. The weights 31, the magnets 35 and the cover 40 are one-piece formed with one another.

Each of the weights 31 preferably includes a lateral weight portion 32 arranged in a vibration-direction outer region and a central weight portion 33 arranged at the other side of the attachment portion 52 in a direction intersecting the vibration direction to extend from the lateral weight portion 32 toward the center of the vibrating body 30. Each of the weights 31 is formed into a substantially L-like shape by the lateral weight portion 32 and the central weight portion 33. The respective weights 31 are arranged in a symmetrical relationship with respect to the longitudinal center of the vibrating body 30. The tip ends of the central weight portions 33 extending in the longitudinal direction are opposed to each other. Since the respective weights 31 are symmetrically arranged while maintaining a left and right balance, the vibrating body 30 can vibrate smoothly. Each of the lateral weight portions 32 has a longitudinally-extending fitting groove 34 formed on the upper surface thereof at the transverse center of the lateral weight portion 32.

As shown in FIG. 2, the lateral weight portion 32 of each of the weights 31 is arranged more outwardly than the outer peripheral portion of the coil 20 in the vibration direction of the vibrating body 30. In case of arranging the lateral weight portion 32 more outwardly than the outer peripheral portion of the coil 20, it is preferred that the lateral weight portion 32 as a whole is arranged more outwardly than the outer peripheral portion of the coil 20. However, as long as the greater part of the lateral weight portion 32 is arranged more outwardly than the outer peripheral portion of the coil 20, an overlapping part may exist between the inner region of the lateral weight portion 32 and the outer peripheral portion of the coil 20.

If the lateral weight portion 32 is arranged more outwardly than the outer peripheral portion of the coil 20, the thickness of the lateral weight portion 32 can be set larger than the thickness of the central weight portion 33. In case where the thickness of the lateral weight portion 32 is set larger than the thickness of the central weight portion 33, the surface of the lateral weight portion 32 lying at the side of the coil 20 protrudes toward the bottom member 11 beyond the surface of the central weight portion 33. More specifically, the surface of the lateral weight portion 32 lying at the side of the coil 20 protrudes toward the rear surface of the coil 20 beyond the front surface of the coil 20 opposed to the vibrating body 30. Even if the weights 31 are formed into the aforementioned shape, the vibrating body 30 can vibrate without interfering with the coil 20. This is because the lateral weight portion 32 is arranged more outwardly than the outer peripheral portion of the coil 20.

Each of the magnets 35 is formed into, e.g., a rectangular parallelepiped shape. The magnets 35 are arranged side by side between the weights 31 with the longitudinal direction thereof oriented in the transverse direction of the vibrating body 30. The magnets 35 are arranged in a well-balanced manner so as to become symmetrical with respect to the longitudinal center of the vibrating body 30.

The cover 40 is made of a magnetic material. The cover 40 preferably includes a body portion 41 covering the arrangement region of the magnets 35 from above. The cover 40 preferably further includes arm portions 42 extending outward from the left and right sides of the body portion 41. The arm portions 42 are fitted to the fitting grooves 34 of the respective weights 31.

The vibrating body 30 preferably includes seat surfaces 36 to which the leaf springs 50 are connected. The seat surfaces 36 are formed on the opposite side surface of the vibrating body 30 from the side surface of the vibrating body 30 on which the central weight portions 33 are arranged. The seat surfaces 36 are formed a little outward of the center of the vibrating body 30 in a symmetrical relationship with each other.

The vibrating body 30 is supported by the leaf springs 50 with the longitudinal direction thereof oriented in a direction orthogonal to the longitudinal direction of the coil 20. The vibrating body 30 is reciprocatingly vibrated in the longitudinal direction of the vibrating body by virtue of the interaction of the magnetic fields generated by the coil 20 and the magnetic fields generated by the magnets 35.

The leaf springs 50 are formed into, e.g., an elongated band shape. Each of the leaf springs 50 is arranged at each of the longitudinal opposite sides of the vibrating body 30. Each of the leaf springs 50 preferably includes the connection portion 51 connected to the vibrating body 30 at one longitudinal end thereof, the attachment portion 52 attached to the inner surface of the circumferential wall portion 13 of the case 12 at the other longitudinal end thereof and the intermediate portion 53 formed between the connection portion 51 and the attachment portion 52. The intermediate portion 53 of each of the leaf springs 50 preferably includes the plurality of curved sections 60, 61, 62 and 63 at which each of the leaf springs 50 extends in a curved shape.

The connection portion 51 and the attachment portion 52 are arranged along the direction intersecting the vibration direction of the vibrating body 30. The vibrating body 30 is interposed between one transverse side and the other transverse side thereof. The connection portion 51 is connected to the vibrating body 30 at one transverse side of the vibrating body 30. The attachment portion 52 is attached to the circumferential wall portion 13 at the other transverse side of the vibrating body 30. The connection portion 51 is formed by linearly extending one end of each of the leaf springs 50 and is bonded to one of the seat surfaces 36 of the vibrating body 30. The attachment portion 52 is formed by linearly extending the other end of each of the leaf springs 50 and is bonded to the circumferential wall portion 13 of the case 12.

The intermediate portion 53 extends from the connection portion 51 toward an outside of the vibrating body 30 around the vibrating body 30. The intermediate portion 53 is positioned in the outside region of the vibrating body 30 to extend across the vibration direction of the vibrating body 30. The intermediate portion 53 is formed in a single layer in the vibration-direction outside region of the vibrating body 30. Due to the existence of the curved section 63, the section of the intermediate portion 53 extending from the longitudinal outside region of the vibrating body 30 to the attachment portion 52 is largely curved toward the central region of the vibrating body 30.

The shape of each of the leaf springs 50 including the connection portion 51, the intermediate portion 53 and the attachment portion 52 will now be described in more detail.

In one transverse side region having the connection portion 51, due to the existence of the three curved sections 60, 61 and 62, each of the leaf springs 50 protrudes from the vibrating body 30 toward the circumferential wall portion 13. In the longitudinal outside region of the vibrating body 30, each of the leaf springs 50 is obliquely formed to go away from the vibrating body 30 and come close to the circumferential wall portion as each of the leaf springs 50 extends from one transverse side region to the other transverse side region having the attachment portion 52. In the outside region of the vibrating body 30, each of the leaf springs 50 does not have such a structure in which the intermediate portion 53 is folded back to form a plurality of layers in the vibration direction. In the outside region of the vibrating body 30, each of the leaf springs 50 does not have such a structure in which a plurality of members is arranged parallel to each other to form a plurality of layers in the vibration direction. In the longitudinal outside region of the vibrating body 30, each of the leaf springs 50 is formed of a single layer in the vibration direction by having the single-layer intermediate portion 53. In the other transverse side region, due to the existence of the curved section 63, each of the leaf springs 50 is largely curved to extend from the longitudinal outside region of the vibrating body 30 toward the central region of the vibrating body 30.

The difference between a case where the vibrating body 30 is supported by the leaf spring 50 of the present invention and a case where a vibrating body is supported by a conventional leaf spring having an acute-angle bent portion (hereinafter referred to as "conventional leaf spring") will be described with reference to FIGS. 6A to 7B.

Figure 6A:
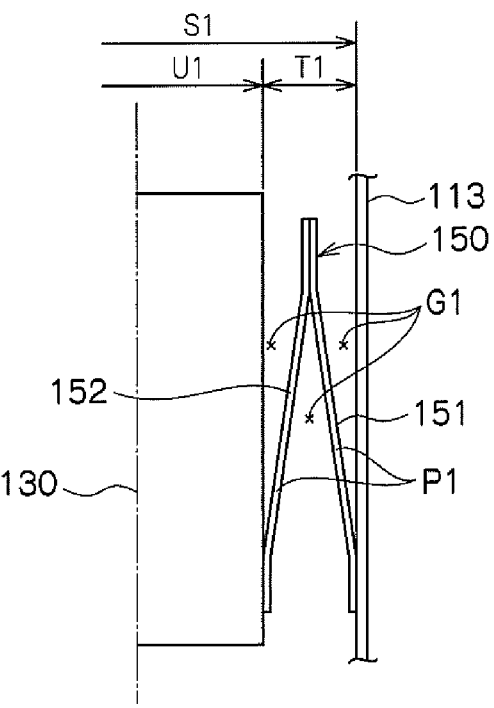
FIGS. 6A and 6B are explanatory views illustrating a state that a vibrating body is supported by a conventional leaf spring.
Figure 6B:
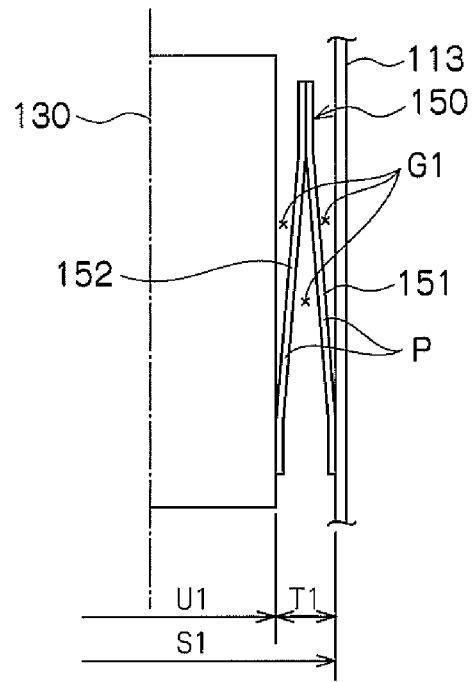

FIGS. 6A and 6B illustrate a case where a vibrating body 130 is supported by a conventional leaf spring 150. The conventional leaf spring 150 has a curved portion formed in the longitudinal center region thereof and bent at an acute angle. The conventional leaf spring 150 is formed into a V-like shape when seen in a plan view. The conventional leaf spring 150 is arranged between the vibrating body 130 and the circumferential wall portion 113. The conventional leaf spring 150 is bonded at one end to the side surface of the vibrating body 130 and at the other end to the circumferential wall portion 113. The conventional leaf spring 150 includes two component parts 151 and 152 that move away from each other (see FIG. 6A) and toward each other (see FIG. 6B) as the vibrating body 130 vibrates. Since the conventional leaf spring 150 is formed into a V-like shape when seen in a plan view, the component parts 151 and 152 are arranged between the vibrating body 130 and the circumferential wall portion 113 in two layers in the vibration direction.

In case where the vibrating body 130 is supported by the conventional leaf spring 150, it is necessary to decide the dimension U1 and structure of the vibrating body 130 and the amplitude of the vibrating body 130 in view of three spatial regions designated by a reference symbol G1 in FIGS. 6A and 6B and two regions designated by a reference symbol P1 where the component parts 151 and 151 exist. In the conventional leaf spring 150, the occupying percentage of the vibration-direction dimension T1 in the dimension S1 between the circumferential wall portions 113 becomes larger. For that reason, the space for the arrangement of the vibrating body 130 becomes relatively small. Moreover, the vibration-direction dimension U1 of the vibrating body 130 is limited by the dimension T1 of the conventional leaf spring 150. This makes it difficult to increase the vibration-direction dimension U1 of the vibrating body 130. In addition, there is no way but to design the vibrating body 130 in a limited structure. In the conventional leaf spring 150, the vibration-direction dimension T1 remains large even in a compressed state. It is therefore difficult to increase the amplitude of the vibrating body 130.

In contrast, the leaf spring 50 of the present invention can enjoy an increased degree of freedom in designing the dimension U2 and structure of the vibrating body 30.

Figure 7A:
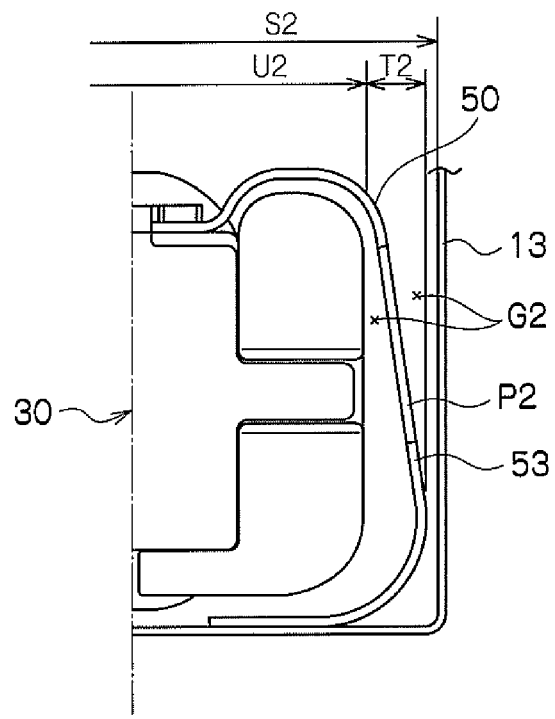
FIGS. 7A and 7B are explanatory views illustrating a state that a vibrating body is supported by a leaf spring employed in the vibration generator of the present invention.
Figure 7B:
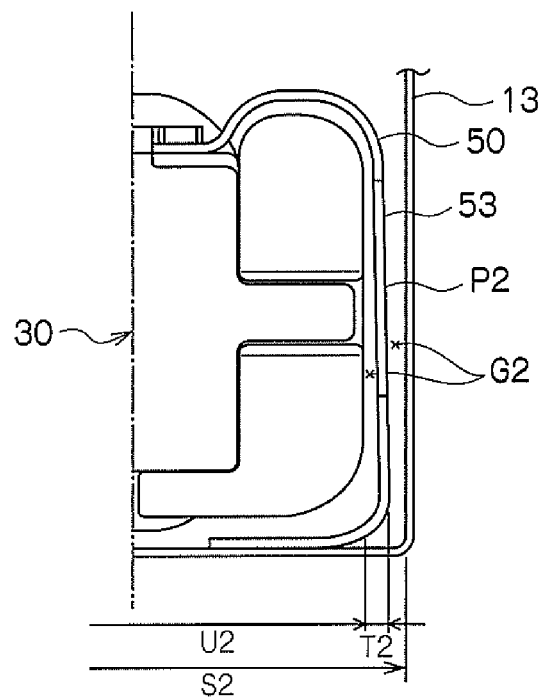

FIG. 7A illustrates a state that the vibrating body 30 is positioned at the vibration-direction center. FIG. 7B depicts a state that the vibrating body 30 is moved toward the vibration-direction outer side. In the leaf spring 50 of the present invention, the connection portion and the attachment portion 52 are arranged at one transverse side and the other transverse side of the vibrating body 30 interposed therebetween. The connection portion 51 and the attachment portion 52 do not exist between the vibrating body 30 and the circumferential wall portion 13 in the vibration direction. Only the single-layer intermediate portion 53 is arranged between the vibrating body 30 and the circumferential wall portion 13 in the vibration direction. In the leaf spring 50 of the present invention, therefore, the occupying percentage of the vibration-direction dimension T2 in the dimension S2 between the circumferential wall portions 113 becomes significantly small. In the leaf spring 50 of the present invention, the dimension U2 and structure of the vibrating body 30 and the amplitude of the vibrating body 30 can be designed in view of only two spatial regions designated by a reference symbol G2 in FIGS. 7A and 7B and one region designated by a reference symbol P2 where the intermediate portion 53 exists.

If the vibrating body 30 is supported by the leaf springs 50 of the present invention, it is possible to increase the vibration-direction dimension U2 of the vibrating body 30. If the vibration-direction dimension U2 of the vibrating body 30 increased, the vibrating body 30 can be formed by arranging the weights 31 at the outer sides distant from the center of the vibrating body 30. If the weights 31 are arranged at the outer sides, the inertial force is increased in proportion thereto. This makes it possible to obtain an inertial force required in generating vibrations as desired even if the vibrating body 30 is lightweight. It is therefore possible to reduce the weight of the vibration generator 1A. Moreover, it is possible to freely form the space defined between the weights 31. Accordingly, the vibrating body 30 can be formed by arranging the magnets having a suitable size and a suitable magnetic force between the weights 31.

In the leaf spring 50 of the present invention, even if the vibrating body 30 is moved toward the circumferential wall portion 13 as shown in FIG. 7B, only the intermediate portion 53 exists between the vibrating body 30 and the circumferential wall portion 13. Accordingly, it is possible to increase the magnitude of the vibrating body 30.

The respective components described above can be assembled by capping the case 12 on the bottom member 11 in a state the coil 20 is held by the coil holder 15 of the bottom member 11 and that the vibrating body 30 is supported on the circumferential wall portion 13 by the leaf springs 50. In the state that the respective components are assembled together, a specified clearance exists between the upper surface of the coil 20 and the lower surface of the vibrating body 30 as shown in FIGS. 2 and 5. In addition, a specified clearance exists between the upper surface of the vibrating body 30 and the top portion 14 of the case 12.

In the vibration generator 1A described above, the coil 20 generates magnetic fields if an electric current flows through the coil 20. The vibrating body 30 is reciprocatingly vibrated in the longitudinal direction of the vibrating body 30 by virtue of the interaction of the magnetic fields generated by the coil 20 and the magnetic fields generated by the magnets 35 of the vibrating body 30. Since the vibrating body 30 is supported by the leaf springs 50 between the coil 20 and the top portion 14 of the case 12, it is possible for the vibrating body 30 to make smooth reciprocating vibrations.

Second Preferred Embodiment

A vibration generator 1B according to a second preferred embodiment preferably includes, in addition to the components of the vibration generator 1A of the first preferred embodiment, a sliding member 70 arranged on the upper surface of the vibrating body 30.

The basic configuration of the vibration generator 1B of the second preferred embodiment is the same as that of the vibration generator 1A of the first preferred embodiment. For that reason, the same components as those of the vibration generator 1A of the first preferred embodiment will be designated by like reference symbols and will be described briefly. Only the components differing from those of the vibration generator 1A of the first preferred embodiment will be described in detail.

Figure 8:
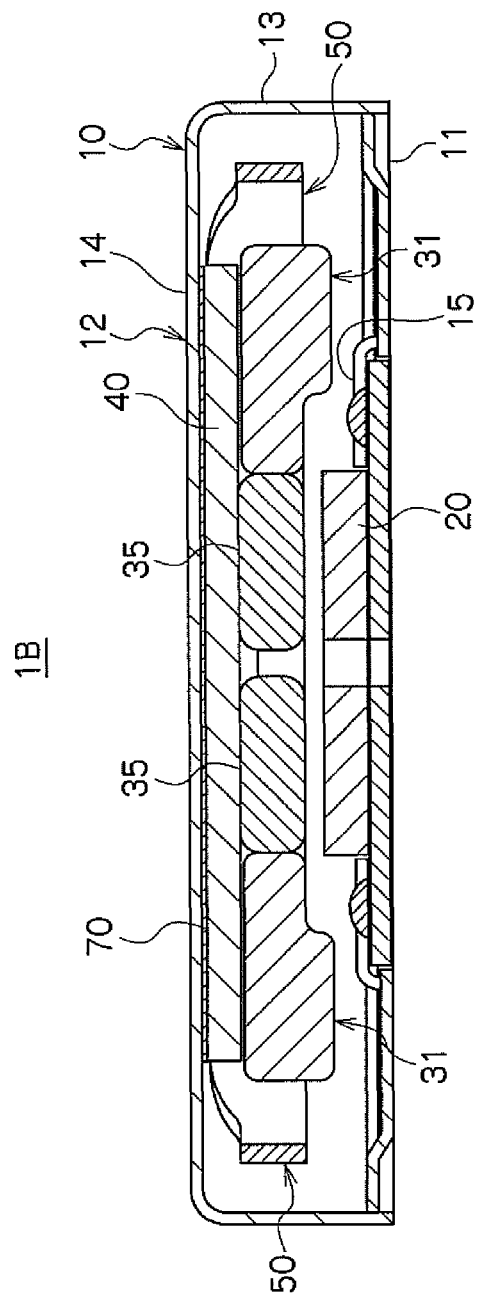
FIG. 8 is a vertical section view showing a vibration generator according to a second preferred embodiment of the present invention.

Referring to FIG. 8, the vibration generator 1B of the second preferred embodiment preferably includes a housing 10 making up an outer shell of the vibration generator 1B. The housing 10 is made of a non-magnetic material and is small in height. The housing 10 preferably includes a bottom member 11 and a case 12 capped on the bottom member 11. The case 12 preferably includes a circumferential wall portion 13 extending along the peripheral edge of the case 12 and a top portion 14 closing the top end of the case 12.

A coil 20 is arranged within the housing 10 and is positioned on the bottom member 11. A vibrating body 30 is arranged within the housing 10 in an opposing relationship with the coil 20. Leaf springs 50 for supporting the vibrating body 30 with respect to the circumferential wall portion 13 are arranged within the housing 10.

The coil 20 is a hollow-core spiral coil and is held by a coil holder 15 attached to the bottom member 11. Lead wires 21 and 22 extend from the inner and outer edges of the coil 20, respectively. The lead wire 22 extending from the inner edge of the coil 20 extends to the outside of the coil 20 through a communication groove 16 of the bottom member 11 interconnecting the inside and the outside of the coil 20 (see FIGS. 4 and 5).

The vibrating body 30 is formed to have, e.g., a rectangular contour or a substantially rectangular contour. The vibrating body 30 preferably includes a pair of weights arranged at the longitudinal opposite sides of the vibrating body 30, a pair of magnets 35 arranged between the weights 31 and a cover 40 covering the magnets 35 from above. The weights 31, the magnets 35 and the cover 40 are one-piece formed with one another.

Each of the weights 31 is formed into a substantially L-like shape by a lateral weight portion 32 and a central weight portion 33. The respective weights 31 are arranged in a symmetrical relationship. The tip ends of the central weight portions 33 of the weights 31 extending in the longitudinal direction are opposed to each other. Each of the magnets 35 is formed into, e.g., a rectangular parallelepiped shape. The magnets 35 are arranged between the weights 31 with the longitudinal direction thereof oriented in the transverse direction of the vibrating body 30. The magnets 35 of the second preferred embodiment are arranged in a symmetrical relationship.

The cover 40 is made of a magnetic material. The cover 40 preferably includes a body portion 41 covering the magnet arrangement region between the weights 31 from above. The cover 40 preferably further includes arm portions 42 extending outward from the left and right sides of the body portion 41. The arm portions 42 are fitted to the fitting grooves 34 of the respective weights 31.

The cover 40 preferably includes a sliding member 70 arranged on the upper surface of the cover 40 and made of a material that generates extremely low friction between the cover 40 and the top portion 14 of the case 12. The sliding member 70 is formed by bonding a sheet-like member to the upper surface of the cover 40 or by coating paint on the upper surface of the cover 40. The sliding member 70 having a sheet shape is made of, e.g., polyimide or polyether ether ketone (PEEK). In case where the sliding member 70 is formed by paint coating, a fluorine resin such as polytetrafluoroethylene formed of tetrafluoroethylene polymers may be coated on the upper surface of the cover 40. The sliding member 70 may be arranged on the inner surface of the top portion 14 of the case 12.

The vibrating body 30 preferably includes seat surfaces 36 to which the leaf springs 50 are connected. The seat surfaces 36 are formed on the opposite side surface of the vibrating body 30 from the side surface of the vibrating body 30 on which the central weight portions 33 are arranged. The seat surfaces 36 are formed a little outward of the longitudinal center of the vibrating body 30 in a symmetrical relationship with respect to the longitudinal center of the vibrating body 30.

The leaf springs 50 are arranged at the opposite sides of the vibrating body 30 in the vibration direction of the vibrating body 30 and are positioned between the vibrating body 30 and the circumferential wall portion 13 of the case 12 to support the vibrating body 30 on the circumferential wall portion 13 (see FIG. 1). Each of the leaf springs 50 preferably includes a connection portion 51 connected to the vibrating body 30 at one longitudinal end of each of the leaf springs 50, an attachment portion 52 attached to the circumferential wall portion 13 at the other longitudinal end of each of the leaf springs 50 and an intermediate portion 53 formed between the connection portion 51 and the attachment portion 52 to extend around the vibrating body 30. The connection portion 51 and the attachment portion 52 of each of the leaf springs 50 are arranged along a direction intersecting the vibration direction of the vibrating body 30. The vibrating body 30 is interposed between one transverse side and the other transverse side thereof. The connection portion 51 is connected to the vibrating body 30 at one transverse side of the vibrating body 30. The attachment portion 52 is attached to the circumferential wall portion 13 of the case 12 at the other transverse side of the vibrating body 30.

The respective components described above can be assembled together by capping the case 12 on the bottom member 11 in a state that the coil 20 is held by the coil holder 15 of the bottom member 11 and that the vibrating body 30 is supported on the circumferential wall portion 13 by the leaf springs 50. In the state that the respective components are assembled together, a specified gap exists between the upper surface of the coil 20 and the lower surface of the vibrating body 30 as shown in FIG. 8. In contrast, the upper surface of the cover 40 of the vibrating body 30 makes contact with the top portion 14 of the case 12 through the sliding member 70.

In the vibration generator 1B according to the second preferred embodiment, the vibrating body 30 is reciprocatingly vibrated in such a manner as to slide along the top portion 14 of the case 12. Movement of the vibrating body 30 in the up-down direction is restrained by the top portion 14 of the case 12. Therefore, there is no possibility that the vibrating body 30 is tilted up and down during vibration. The vibration generator 1B according to the second preferred embodiment can effectively prevent the vibrating body 30 from getting tilted, if the vibration-direction dimension of the vibrating body 30 is increased, if the weights 31 are arranged in the outer regions of the vibrating body 30 or if the amplitude of the vibrating body 30 is made large. Since the vibrating body 30 makes contact with the top portion 14 of the case 12 through the sliding member 70 arranged on the upper surface of the cover 40, the vibrating body 30 can smoothly vibrate without generating any strange noise.

While a pair of leaf springs 50 is arranged at the opposite sides of the vibrating body 30 in the vibration generator 1A of the first preferred embodiment and the vibration generator 1B of the second preferred embodiment, it may possible to use a one-piece leaf spring. For example, the leaf springs arranged at the opposite sides of the vibrating body 30 may be formed into a one-piece member by interconnecting the connection portions 51 thereof or by interconnecting the attachment portions 52 thereof. If the leaf springs 50 are formed into a one-piece member, it becomes possible to reduce the number of components. Along with the reduction in the number of components, it is possible to reduce the number of assembling steps and to facilitate an assembling process. The fixing strength and the accuracy of the leaf springs 50 can be increased by forming the leaf springs 50 into a one-piece member.

While various preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A vibration generator, comprising: a housing including a circumferential wall portion extending along a peripheral edge of the housing; a vibrating body arranged inside of the circumferential wall portion of the housing in an opposing relationship with a coil and configured to reciprocatingly vibrate in one direction, the vibrating body having a first profile extending in a longitudinal direction having a first end and a second end, the first end opposite to the second end in the longitudinal direction of the vibrating body; a band-like leaf spring arranged between the vibrating body and the circumferential wall portion to support the vibrating body on the circumferential wall portion, wherein the leaf spring has a second profile entirely located outside the first profile of the vibrating body in a plan view, the leaf spring comprising a first attachment portion, a first intermediate portion, a connection portion, a second intermediate portion and a second attachment portion, wherein the connection portion is connected to the first end of the vibrating body, wherein the first attachment portion and the second attachment portion are attached to the circumferential wall portion, such that the first attachment portion and the second attachment portion are separated from and opposed to the second end of the vibrating body, wherein the first intermediate portion extends between the connection portion and the first attachment portion, and the second intermediate portion extends between the connection portion and the second attachment portion.

2. The vibration generator of claim 1, wherein the vibrating body includes a pair of weights arranged in vibration-direction outer regions of the vibrating body and a magnet arranged between the weights.

3. The vibration generator of claim 2, wherein each of the weights includes a lateral weight portion arranged in each of the vibration-direction outer regions of the vibrating body and a central weight portion arranged at the other transverse side of the vibrating body along the direction intersecting the vibration direction of the vibrating body to extend from the lateral weight portion toward the vibration-direction center of the vibrating body.

4. The vibration generator of claim 3, wherein the lateral weight portion is arranged outward of an outer peripheral portion of the coil in the vibration direction of the vibrating body.

5. The vibration generator of claim 4, wherein the lateral weight portion includes a surface lying at the side of the coil and protruding toward a rear surface of the coil beyond a front surface of the coil opposed to the vibrating body.

6. The vibration generator of claim 1, wherein the leaf spring includes a first and a second leaf spring respectively arranged at the vibration-direction opposite sides of the vibrating body.

7. The vibration generator of claim 1, wherein the housing further includes a bottom member to which the coil is attached and a case having the circumferential wall portion and a top portion closing a top end thereof, the vibrating body including an upper surface making contact with an inner surface of the top portion, and the vibration generator further comprises: a sliding member arranged on at least one of an upper surface of the vibrating body and an inner surface of the top portion to smoothly slide the vibrating body with respect to the inner surface of the top portion.

8. The vibration generator of claim 1, wherein the coil is a hollow-core spiral coil formed by spirally winding a wire, the bottom member of the housing having a communication groove interconnecting the inside and the outside of the coil, the coil including a lead wire extending from an inner edge of the coil and passing through the communication groove.

* * * * *